(12) United States Patent (10) Patent No.: US 9,888,126 B2
Dong et al. (45) Date of Patent: Feb. 6, 2018

(54) MULTIPURPOSE CONFERENCING TERMINAL AND MULTIPURPOSE CONFERENCE SYSTEM

(71) Applicant: BOE TECHNOLOGY GROUP CO., LTD., Beijing (CN)

(72) Inventors: Youmei Dong, Beijing (CN); Jing Su, Beijing (CN); Xuewen Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 29 days.

(21) Appl. No.: 14/787,341

(22) PCT Filed: Jun. 11, 2015

(86) PCT No.: PCT/CN2015/081209
§ 371 (c)(1),
(2) Date: Oct. 27, 2015

(87) PCT Pub. No.: WO2016/112620
PCT Pub. Date: Jul. 21, 2016

(65) Prior Publication Data
US 2016/0212183 A1    Jul. 21, 2016

(30) Foreign Application Priority Data
Jan. 16, 2015   (CN) .......................... 2015 1 0024131

(51) Int. Cl.
*H04M 3/56* (2006.01)
*H04L 29/06* (2006.01)
(Continued)

(52) U.S. Cl.
CPC ........ *H04M 3/567* (2013.01); *H04L 65/1083* (2013.01); *H04L 65/4038* (2013.01);
(Continued)

(58) Field of Classification Search
CPC ............... H04M 3/56; H04M 3/42365; H04M 2203/2044; H04M 2203/5009;
(Continued)

(56) References Cited

U.S. PATENT DOCUMENTS 5,991,276 A * 11/1999 Yamamoto .......... H04L 12/1827
348/E7.084
7,085,364 B1 * 8/2006 Ahmed ................... H04M 3/16
370/267
(Continued)

FOREIGN PATENT DOCUMENTS

CN          1829155 A     9/2006
CN        101938625 A     1/2011
(Continued)

OTHER PUBLICATIONS

ISR issued in international application No. PCT/CN2015/081209 dated Jul. 29, 2015.
(Continued)

*Primary Examiner* — Olumide T Ajibade Akonai
(74) *Attorney, Agent, or Firm* — Nath, Goldberg & Meyer; Joshua B. Goldberg

(57) ABSTRACT

The present invention discloses a multipurpose conferencing terminal and a multipurpose conferencing system. The multipurpose conferencing terminal comprises a display device and a control circuit, and the control circuit comprises a wireless communication module through which the multipurpose conferencing terminal communicates with a mobile terminal of a corresponding attendee. As the multipurpose conferencing terminal of the present invention has the wireless communication module capable of communicating with the mobile terminal of the attendee, a communication between the multipurpose conferencing terminal and the mobile terminal of the attendee is realized.

18 Claims, 7 Drawing Sheets

(51) Int. Cl.
*H04N 7/14* (2006.01)
*H04L 12/18* (2006.01)
*H04N 7/15* (2006.01)

(52) U.S. Cl.
CPC ...... *H04L 12/1818* (2013.01); *H04L 12/1831* (2013.01); *H04L 65/403* (2013.01); *H04M 2250/12* (2013.01); *H04M 2250/62* (2013.01); *H04N 7/141* (2013.01); *H04N 7/15* (2013.01)

(58) Field of Classification Search
CPC ..... H04M 2203/5054; H04M 2250/62; H04M 3/563; H04M 1/27455; H04M 3/567; H04M 3/568; H04M 3/562; H04M 3/564; H04L 67/24; H04L 12/1818; H04L 65/403; H04L 12/1822; H04L 12/1827; H04L 12/1813; H04L 41/0803; H04L 65/1069; H04L 65/1083; H04L 65/4038; H04L 12/1831; H04W 4/16; H04W 8/005; H04W 4/08; H04W 76/02; H04W 84/20; H04N 7/15; H04N 7/141
See application file for complete search history.

(56) References Cited

U.S. PATENT DOCUMENTS

| | | |
|---|---|---|
| 7,580,704 B2 | 8/2009 | Narita |
| 7,978,216 B2 | 7/2011 | Asthana et al. |
| 8,095,120 B1 * | 1/2012 | Blair ............... H04M 3/562 379/202.01 |
| 8,320,939 B1 | 11/2012 | Vincent |
| 8,350,700 B2 | 1/2013 | Fast et al. |
| 2005/0069116 A1* | 3/2005 | Murray, II .......... H04L 12/1818 379/202.01 |
| 2007/0285503 A1 | 12/2007 | Asthana et al. |
| 2008/0055394 A1 | 3/2008 | Shiue |
| 2008/0218586 A1* | 9/2008 | Graham ............... H04L 12/1822 348/14.09 |
| 2009/0268008 A1* | 10/2009 | Topits ................... H04M 3/567 348/14.09 |
| 2010/0188473 A1 | 7/2010 | King et al. |
| 2010/0271456 A1* | 10/2010 | Tsumura .................. H04N 7/15 348/14.08 |
| 2011/0157366 A1* | 6/2011 | Padmanabh ............. H04N 7/15 348/159 |
| 2012/0086552 A1 | 4/2012 | Fast et al. |
| 2015/0163068 A1* | 6/2015 | Cudak ................. H04L 12/1822 709/204 |
| 2016/0042281 A1* | 2/2016 | Cunico ................. H04L 65/403 706/11 |
| 2016/0065742 A1* | 3/2016 | Nasir ...................... H04M 3/56 455/416 |

FOREIGN PATENT DOCUMENTS

| | | |
|---|---|---|
| CN | 102307294 A | 1/2012 |
| CN | 103096020 A | 5/2013 |
| CN | 103747199 A | 4/2014 |
| GB | 2318022 A | 4/1998 |
| WO | 2007/113580 A1 | 10/2007 |
| WO | 2007113580 A1 | 10/2007 |

OTHER PUBLICATIONS

Extended European Search Report dated Feb. 27, 2017 corresponding to application No. 15788309.1-1502.

Office Action dated Aug. 17, 2017 issued in corresponding Chinese Application No. 201510024131.8.

\* cited by examiner

MULTIPURPOSE CONFERENCING TERMINAL AND MULTIPURPOSE CONFERENCE SYSTEM

This is a National Phase Application filed under 35 U.S.C. 371 as a national stage of PCT/CN2015/081209, filed Jun. 11, 2015, an application claiming the benefit of Chinese Application No. 201510024131.8, filed Jan. 16, 2015, the content of each of which is hereby incorporated by reference in its entirety.

FIELD OF THE INVENTION

The present invention relates to the technical field of display, in particular to a multipurpose conferencing terminal and a multipurpose conferencing system.

BACKGROUND OF THE INVENTION

At present, conferencing terminals are increasingly employed in various conferences. The conferencing terminals in the prior art may be configured to display conference information which may include information about a conference and/or information about attendees. When an attendee uses a conferencing terminal at a conference, the attendee information and the conference information can be viewed only through the conferencing terminal.

With the popularization of mobile terminals, the attendees generally carry mobile terminals to a conference. However, in the prior art, the conferencing terminals and mobile terminals used by the attendees cannot communicate with each other.

SUMMARY OF THE INVENTION

The present invention provides a multipurpose conferencing terminal and a multipurpose conferencing system, which are capable of realizing a communication between the multipurpose conferencing terminal and a mobile terminal.

In order to realize the aforementioned objective, the present invention provides a multipurpose conferencing terminal, which includes a display device and a control circuit, and the control circuit includes a wireless communication module through which the multipurpose conferencing terminal communicates with a mobile terminal of a corresponding attendee.

Optionally, the control circuit is configured to create a communicative connection with the mobile terminal of the corresponding attendee through the wireless communication module, and acquire stored terminal information from the mobile terminal; and the display device is configured to display the acquired terminal information.

Optionally, the multipurpose conferencing terminal communicates with a main server of a conference; and the control circuit is configured to receive server information sent by the main server of the conference, and send the server information to the mobile terminal through the wireless communication module.

Optionally, the multipurpose conferencing terminal further includes a person detection module, and the control circuit further includes a first judgment module and a recording module;

the person detection module is configured to acquire one or more images, and send the acquired one or more images to the first judgment module;

the first judgment module is configured to judge whether the corresponding attendee has left the conference according to the acquired images; and the recording module is configured to record content of the conference when the first judgment module judges that the corresponding attendee has left the conference.

Optionally, the multipurpose conferencing terminal further includes a body parameter measuring device, and the control circuit further includes a second judgment module and a prompting module;

the body parameter measuring device is configured to measure body information of the corresponding attendee;

the second judgment module is configured to judge body state of the attendee according to the body information; and the prompting module is configured to send prompt information according to the body state of the attendee.

Optionally, the control circuit further includes an interference module; and the interference module is configured to cause interference with the mobile terminal under a preset condition.

Optionally, the control circuit further includes a privilege authentication module; and the privilege authentication module is configured to perform privilege authentication on the mobile terminal, and allow the mobile terminal to communicate with other communication devices outside a conference room after the privilege authentication is successful.

Optionally, the control circuit further includes a positioning module and an alarm module;

the positioning module is configured to detect a position of the multipurpose conferencing terminal; and the alarm module is configured to send alarm information when the positioning module detects that the multipurpose conferencing terminal has been taken away from a conference room in a set period of time.

In order to realize the aforementioned objective, the present invention provides a multipurpose conferencing system, including a plurality of aforementioned multipurpose conferencing terminals and at least one mobile terminal of an attendee corresponding to one of the multipurpose conferencing terminals.

Optionally, an instant communication is performed among the multipurpose conferencing terminals.

Optionally, the multipurpose conferencing system further includes a main server of a conference; and the main server of the conference is configured to send instruction information or server information to the multipurpose conferencing terminals, and/or receive data information from the multipurpose conferencing terminals and process the data information.

Optionally, the control circuit further includes a guide signal module; and the guide signal module is configured to send guide information according to the instruction information sent by the main server, and the guide information is used for guiding the attendee to his/her seat.

Optionally, the instruction information is sent after the main server receives a guide request sent by the mobile terminal of the attendee, the instruction information is used for instructing the multipurpose conferencing terminal corresponding to the mobile terminal to provide guidance, and the guide request is sent when the mobile terminal of the attendee communicates with the main server.

The present invention has the following beneficial effects.

In the multipurpose conferencing terminal and the multipurpose conferencing system provided by the present invention, the multipurpose conferencing terminal has a wireless communication module capable of communicating with the mobile terminal of the attendee. Consequently, communication between the multipurpose conferencing terminal and the mobile terminal of the attendee is realized.

DESCRIPTION OF THE PREFERRED EMBODIMENT

In order to make those skilled in the art understand the technical solutions of the present invention better, the multipurpose conferencing terminal and the multipurpose conferencing system provided by the present invention will be described below in detail with reference to the accompanying drawings.

Figure 1:
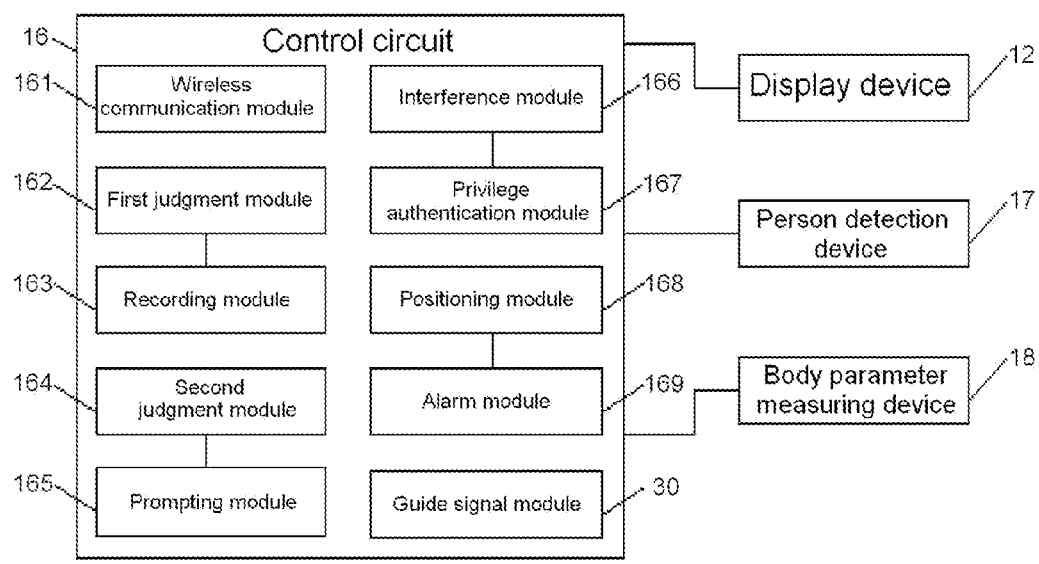
FIG. 1 is a schematic function block diagram of a multipurpose conferencing terminal provided by an embodiment of the present invention.

FIG. 1 is a function block diagram of a multipurpose conferencing terminal provided by an embodiment of the present invention. As shown in FIG. 1, the multipurpose conferencing terminal includes a display device 12 and a control circuit 16, and the control circuit 16 includes a wireless communication module 161 through which the multipurpose conferencing terminal communicates with a mobile terminal of a corresponding attendee.

In the embodiment, the wireless communication module 161 may include a phone call module, a short message transceiver module, a Bluetooth module, an infrared module, a GPRS (General Packet Radio Service) access module or a WIFI module and the like. Accordingly, the mobile terminal of the attendee may also have a wireless communication function, so as to realize communication with the multipurpose conferencing terminal. For example, the mobile terminal may include a mobile phone or a tablet. In one specific example, each multipurpose conferencing terminal corresponds to one attendee.

The display device 12 is configured to display conference information. In the embodiment, the conference information may include information about a conference and/or information about attendees, for example, name, title, affiliated unit and the like of the attendees, and may also be conference data, conference schedule, conference seat number and the like. A main server of the conference may send the information about the attendees to the control circuit of the multipurpose conferencing terminal by wireless transmission, the control circuit sends the information about the attendees to the display device, and then the display device displays the information about the attendees. The display device may include a liquid crystal display device, an OLED display device, a flexible display device or an electronic paper display device, etc.

Preferably, the control circuit 16 is configured to create a communicative connection with the mobile terminal of the corresponding attendee through the wireless communication module 161, and acquire stored terminal information from the mobile terminal. The display device 12 is configured to display the acquired terminal information. The control circuit 16 may search for mobile terminals nearby through the wireless communication module 161, and determine the mobile terminal of the corresponding attendee among the found mobile terminals nearby so that the control circuit 16 may create the communicative connection with the mobile terminal of the corresponding attendee through the wireless communication module 161. The way in which the control circuit 16 acquires the terminal information from the mobile terminal may include: the mobile terminal directly pushes the stored terminal information to the control circuit 16; or the control circuit 16 sends a request to the mobile terminal, and the mobile terminals returns the terminal information to the control circuit 16 after receiving the request. The terminal information may be various types of information stored in the mobile terminal. For example, the terminal information may include short messages, WeChat messages, calls or the like. In this way, the attendee may view and edit the terminal information on the mobile terminal through the multipurpose conferencing terminal during the conference.

Preferably, the multipurpose conferencing terminal communicates with the main server of the conference. The control circuit 16 is configured to receive server information sent by the main server of the conference, and send the server information to the mobile terminal through the wireless communication module 161. The server information may include various types of information about the conference, for example: conference data, conference progress and/or conference reminder and the like. In practical application, the server information may further include other types of information, which will not be listed exhaustively herein. The mobile terminal may display the server information after receiving the server information. In this way, the attendee may view and edit the server information on the multipurpose conferencing terminal through the mobile terminal during the conference.

Preferably, the multipurpose conferencing terminal includes a person detection device 17, and the control circuit 16 includes a first judgment module 162 and a recording module 163. The person detection device 17 is configured to acquire images, and send the acquired images to the first judgment module 162; and the first judgment module 162 is configured to judge whether the corresponding attendee has left the conference according to the acquired images, and the recording module 163 is configured to record the content of the conference when the first judgment module 162 judges that the corresponding attend has left the conference.

The person detection device 17 may be arranged on the display device 12, for example, be arranged on the top of the display device 12 when the multipurpose conferencing terminal is normally placed on a placement surface. Optionally, the person detection device 17 may include a binocular camera, i.e. two cameras, there is a set distance between the two cameras and the set distance is known. When there is an attendee within a range that the cameras can capture, the two cameras and the attendee constitute three apexes of a triangle, each camera takes, for example, one image and sends the image to the first judgment module 162, and the first judgment module 162 calculates an angle of the attendee relative to each camera in each of the two images according to the two images respectively. As the distance and the formed angle between the two cameras are both known, an angle formed by a line from the attendee to one camera and a line between the two cameras may also be calculated, that is, the length of the base side (the line between the two cameras) and two base angles of the triangle are known, so the lengths of the other sides of the triangle may be calculated. As the distance between the two cameras is relatively small, an average value of the lengths of the other two sides approximates to the distance between the attendee and the multipurpose conferencing terminal, and the first judgment module 162 judges whether the distance is less than or equal to a set threshold. If the distance is less than or equal to the set threshold, it is determined that the attendee is the corresponding attendee and the attendee sits in front of the multipurpose conferencing terminal. That is, it is judged that the corresponding attendee has not left the conference. If the distance is judged to be greater than the set threshold, it is determined that the attendee is not the corresponding attendee and the corresponding attendee has left the conference. Of course, no attendee may be included in the range that the cameras may capture. In this case, it is judged that the corresponding attendee has left the conference. Optionally, the person detection device 17 may include only one camera which takes, for example, one image and sends the image to the first judgment module 162. When the image taken by the camera includes a person image, the first judgment module 162 calculates, according to the occupied area of the silhouette of the person (for example, the attendee) in the image, an angle of view of the person at the camera, thus to estimate the distance between the person in the image and the camera, and judge whether the distance between the person and the camera is less than or equal to the set threshold. If the distance is less than or equal to the set threshold, it is determined that the person is the corresponding attendee and the attendee sits in front of the multipurpose conferencing terminal. That is, it is judged that the corresponding attendee has not left the conference. If the distance between the person and the camera is judged to be greater than the set threshold, it is determined that the person is not the corresponding attendee and the corresponding attendee has left the conference. Of course, no person image may be included in the image taken by the camera. In this case, it is judged that the corresponding attendee has left the conference. Preferably, in a case where it is judged that the corresponding attendee has left the conference, the control circuit 16 may control the recording module 163 to perform conference speech recording or conference video recording according to a preset instruction. That is, the recording module 163 is configured to perform conference speech recording or conference video recording when the first judgment module 162 judges that the corresponding attendee has left the conference, thus to automatically record the content of the conference when the attendee leaves the conference for a while. Additionally, it should be understood by those of ordinary skill in the art that the shooting direction of the camera may be adjusted according to demands to take a suitable desired image, thereby accurately judging whether the corresponding attendee has left the conference.

Optionally, the multipurpose conferencing terminal further includes a body parameter measuring device 18, and the control circuit 16 includes a second judgment module 164 and a prompting module 165. A body parameter measuring module 4 is configured to measure body information of the corresponding attendee; the second judgment module 164 is configured to judge the body state of the attendee according to the body information; and the prompting module 165 is configured to send prompt information according to the body state of the attendee. The body parameter measuring module 4 may be arranged on the display device 12. The body information may include eyeball motion, body temperature and/or complexion and the like. For example, when the body information is the eyeball motion, the body parameter measuring module 4 may include a camera which records the eyeball motion or eyelid motion of the attendee. The second judgment module 164 judges whether the frequency of the eyeball motion or the eyelid motion of the attendee is less than or equal to a set frequency. If the frequency of the eyeball motion or the eyelid motion is judged to be less than or equal to the set frequency, it is determined that the attendee is tired as for the body state. If the frequency of the eyeball motion or the eyelid motion is judged to be greater than the set frequency, it is determined that the attendee is not tired as for the body state. When the body information is the body temperature, the body parameter measuring module 4 may include an infrared thermometer which measures the body temperature of the attendee. The second judgment module 164 judges whether the body temperature of the attendee is greater than or equal to a set body temperature. If the body temperature of the attendee is judged to be greater than or equal to the set body temperature, it is determined that the attendee is unhealthy as for the body state. If the body temperature of the attendee is judged to be less than the set body temperature, it is determined that the attendee is healthy as for the body state. When the body information is the complexion, the body parameter measuring module 4 may include a camera which takes a facial image of the attendee. The second judgment module 164 judges the color value of the facial image of the attendee. If the color value of the facial image is judged to be less than or equal to a set color value, it is determined that the attendee is unhealthy as for the body state. If the color value of the facial image is judged to be greater than the set color value, it is determined that the attendee is healthy as for the body state. The prompting module 165 is configured to send prompt information when the second judgment module 164 judges that the attendee is tired or unhealthy as for the body state, the prompt information may be information for reminding a conference controller of controlling the pace of the conference and/or information for reminding that the attendee suffers physical complaints. Preferably, the prompt information may be sound or texts. If the prompt information is the information for reminding the conference controller of controlling the pace of the conference, the prompt information may be sent to the main server of the conference.

Preferably, the control circuit 16 includes an interference module 166 which is configured to cause interference with the mobile terminal under a preset condition. For example, the preset condition may include: a confidential conference starts or the conference is being in a confidential stage. Specifically, the interference module 166 may be configured to cause interference with network signals of the mobile terminal, so that the mobile terminal cannot normally communicate with other communication devices outside a conference room.

Preferably, the control circuit 16 includes a privilege authentication module 167. The privilege authentication module 167 is configured to perform privilege authentication on the mobile terminal, and allow the mobile terminal to communicate with other communication devices outside the conference room after the privilege authentication is successful. The privilege authentication module 167 may be a card information authentication module which, after an attendee having a specific privilege (for example, a privilege to attend a conference) swipes his/her card, performs privilege authentication on the card information; or, the privilege authentication module 167 may be a fingerprint authentication module which, after an attendee having a specific privilege is fingerprinted, performs privilege authentication on the fingerprint information. Additionally, the privilege authentication module may also be other authentication modules, such as voice recognition, face recognition and the like.

Preferably, the control circuit 16 includes a positioning module 168 and an alarm module 169. The positioning module 168 is configured to detect the position of the multipurpose conferencing terminal. The alarm module 169 is configured to send alarm information when the positioning module 168 detects that the multipurpose conferencing terminal has been taken away from the conference room in a set period of time, so that the multipurpose conferencing terminal has anti-theft and loss prevention functions. The positioning module may be, for example, a GPS (global positioning system) positioning module, an A-GPS (assisted GPS) module and the like; and the alarm module may be, for example, a loudspeaker, a signal indicator, a message emitting module and the like.

In the embodiment, the control circuit may include a processer, a memory, an input/output module and a power charging module (none of them are specifically shown in the figure). The processer may be a CPU chip, the memory may be a memory chip, the input/output module is configured to input and output information, and the power charging module may include a charging circuit and a rechargeable battery. Preferably, the charging circuit may be a wireless charging circuit, and the rechargeable battery may be a lithium battery, a solar rechargeable battery or other types of rechargeable batteries. The multipurpose conferencing terminal is powered by a wireless charging circuit in aid of a rechargeable battery, and a power line is saved, so that the multipurpose conferencing terminal is more portable. The input/output module may be used together with an SD card or an USB interface, or may also be used together with a physical keyboard or a virtual touch keyboard, so that the multipurpose conferencing terminal has an excellent information input function; and the input/output module may be cooperated with the display device to perform video output, and may also be cooperated with the loudspeaker to perform audio output. The control circuit may further be used together with functional modules such as a voter, a call serving module, an identification module, a camera and a simultaneous interpretation module, to constitute a conferencing terminal of comprehensive purposes. The multipurpose conferencing terminal may interact with the attendee through the output/input module conveniently.

In the multipurpose conferencing terminal provided by the embodiment, as the control circuit includes the wireless communication module through which the multipurpose conferencing terminal communicates with the mobile terminal of the attendee, a communication between the multipurpose conferencing terminal and the mobile terminal is realized.

Figure 2:
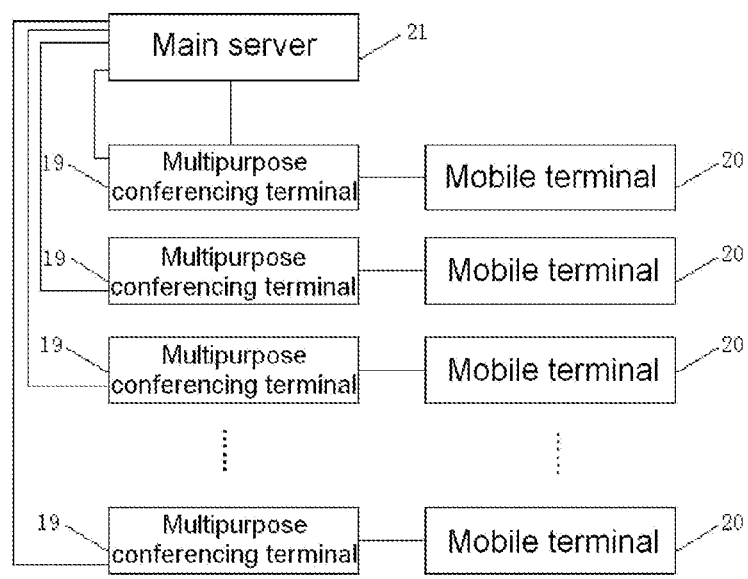
FIG. 2 is a schematic diagram of construction of a multipurpose conferencing system provided by an embodiment of the present invention.

FIG. 2 is a schematic diagram of construction of a multipurpose conferencing system provided by an embodiment of the present invention. As shown in FIG. 2, the multipurpose conferencing system includes a plurality of multipurpose conferencing terminals 19 and at least one mobile terminal 20 of an attendee corresponding to one of the multipurpose conferencing terminals 19. The multipurpose conferencing terminal provided by the aforementioned embodiment may be used as the multipurpose conferencing terminal 19 in the multipurpose conferencing system of the embodiment, and the description for it will not be repeated herein. FIG. 2 shows a solution where each multipurpose conferencing terminal 19 corresponds to one mobile terminal 20. The multipurpose conferencing terminal 19 may communicate with the mobile terminal 20 of the corresponding attendee through the wireless communication module 161 in its control circuit 16.

Preferably, an instant communication may be performed among the multipurpose conferencing terminals 19. Specifically, an instant text communication, an instant voice communication or an instant video communication may be performed among the multipurpose conferencing terminals 19. The multipurpose conferencing terminals 19 may display information about all attendees of the conference, the attendees using the multipurpose conferencing terminals 19 may find a specific attendee among all the attendees according to the information about the attendees, and initiate the instant communication with the multipurpose conferencing terminal 19 corresponding to the specific attendee.

Preferably, the multipurpose conferencing system further includes a main server 21 of the conference, which is configured to send instruction information or server information to the multipurpose conferencing terminals 19, and/or receive data information from the multipurpose conferencing terminals 19 and process the data information. The data information may be any type of information to be processed by the main server 21.

Preferably, the control circuit 16 of the multipurpose conferencing terminal 19 may further include a guide signal module 30 which is configured to send guide information according to the instruction information sent by the main server, and the guide information is used for guiding the attendee to his/her seat. The guide information may include response information and/or display information, for example, the repose information may include an acoustic response and/or a light response, and the display information may be a name of an attendee. In the embodiment, the mobile terminal 20 of the attendee sends a guide request after communicating with the main server; and the main server sends instruction information for instructing the multipurpose conferencing terminal corresponding to the mobile terminal 20 to provide guidance, after receiving the guide request sent by the mobile terminal 20 of the attendee. In the multipurpose conferencing system provided by the embodiment, the control circuit includes a wireless communication module through which the multipurpose conferencing terminal communicates with the mobile terminal of the attendee. Hence, a communication between the multipurpose conferencing terminal and the mobile terminal is realized.

The structure of the multipurpose conferencing terminal in the present invention will be described below with reference to specific embodiments, and the description is illustrative and non-limiting.

Figure 3:
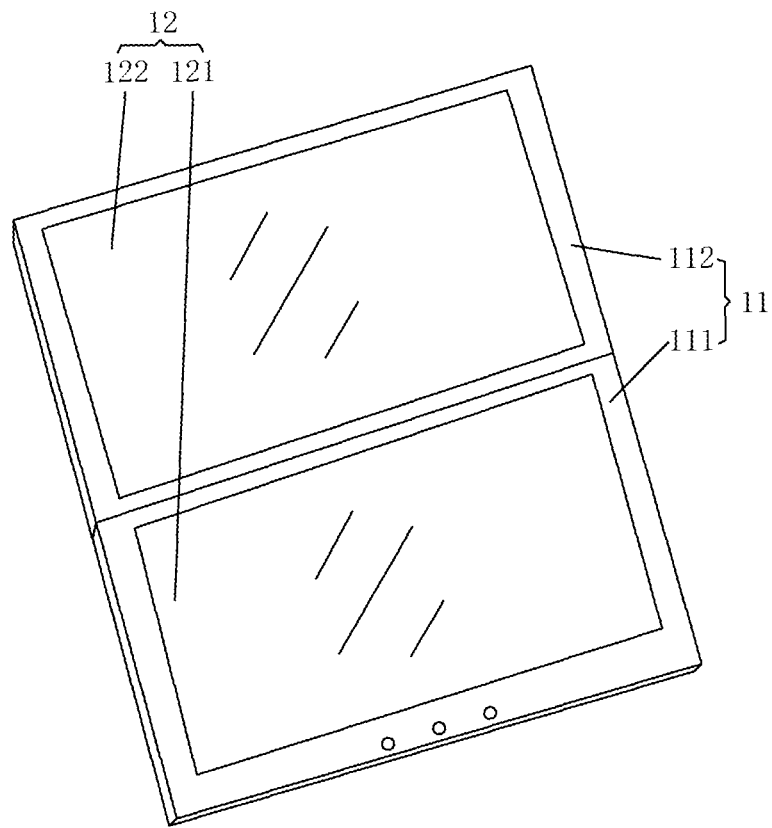
FIG. 3 is a schematic diagram of a multipurpose conferencing terminal provided by an embodiment of the present invention.

FIG. 3 is a schematic diagram of the multipurpose conferencing terminal provided by an embodiment of the present invention. As shown in FIG. 3, the multipurpose conferencing terminal includes a display device 12 and a bending structure provided on the display device 12 (see FIG. 5 or FIG. 12). The display device 12 includes a first display region 121 and a second display region 122. The bending structure is connected between the first display region 121 and the second display region 122, so that the first display region 121 may be bent or unfolded (unbent) relative to the second display region 122. In other words, the first display region 121 is flexibly connected to the second display region 122 through the bending structure.

Figure 4:
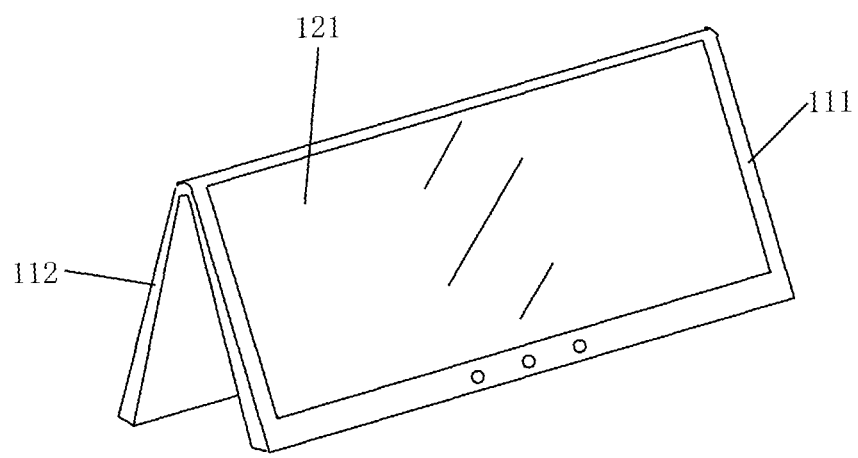
FIG. 4 is a schematic diagram of the multipurpose conferencing terminal of FIG. 3 in a bent state.

FIG. 4 is a schematic diagram of the multipurpose conferencing terminal of FIG. 3 in a bent state. As shown in FIG. 4, when the first display region 121 is in the bent state relative to the second display region 122, the multipurpose conferencing terminal may be placed on a placement surface by the support of the first display region 121 and second display region 122 which are bent relative to each other. In this case, the first display region 121 and the second display region 122 are configured to display content information separately. An included angle between a plane of the first display region 121 and a plane of the second display region 122 may be a set angle. The content information may include first content information and second content information. The first display region 121 may be configured to display the first content information which may be information about a conference, for example, the information about the conference may be conference schedule or presentation content; and the second display region 122 may be configured to display the second content information, for example, the second content information may be information such as name and position of an attendee. In this case, the multipurpose conferencing terminal may be used by an attendee as an electronic table stand. The placement surface may be a table top. The display device 12 may include a borderless display device and a bordered display device. In the solution corresponding to FIG. 3, the display device 12 is a bordered display device, so the multipurpose conferencing terminal further includes a border 11 configured to secure the display device 12, and the display device 12 may be arranged within the border 11. Optionally, an anti-slip mat (not shown in the figure) is provided in a portion, configured to come into contact with the placement surface when the multipurpose conferencing terminal is in the bent state, of the border 11, so as to maintain the bending posture of the multipurpose conferencing terminal stable when the multipurpose conferencing terminal is placed on the placement surface such as a table top and the like.

As shown in FIG. 3, when the multipurpose conferencing terminal is in an unfolded state, the first display region 121 and the second display region 122 may be merged into one display region, so that the multipurpose conferencing terminal may serve as a flat portable electronic device such as a tablet. Preferably, the bending structure is configured to cause the first display region 121 and the second display region 122 to be in the same plane when the multipurpose conferencing terminal is in the unfolded state, so that the first display region 121 and the second display region 122 are merged into one display region to display an entire picture together. Consequently, the multipurpose conferencing terminal may have a larger display area and display more content in one display region. In this case, an attendee may hold and operate the multipurpose conferencing terminal at any angle.

Figure 5:
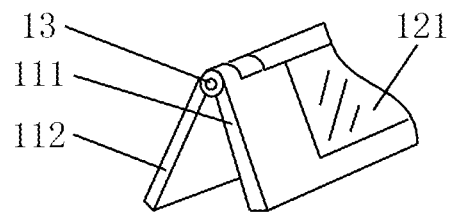
FIG. 5 is a schematic diagram of a bending structure of the multipurpose conferencing terminal of FIG. 4.

FIG. 5 is a schematic diagram of the bending structure of the multipurpose conferencing terminal of FIG. 4. As shown in FIG. 5, the bending structure 13 is positioned between the first display region 121 and the second display region 122. In the embodiment shown in FIG. 3, the bending structure 13 is arranged on the border 11. The bending structure 13 may be a structure capable of folding the multipurpose conferencing terminal. Preferably, the bending structure 13 is a hinge. Or, the bending structure may be, for example, two rigid sheets connected to each other by flexible material. Or, the bending structure may be constituted of a plurality of nested rigid components capable of moving relative to each other, for example, like a variable support for a table lamp. The rigid portion of the bending structure may be secured with the display device by, for example, bonding, buckling, inlaying and other means.

In the embodiment shown in FIG. 3, the border 11 includes a first sub-border 111 and a second sub-border 112, the first display region 121 is arranged within the first sub-border 111, and the second display region 122 is arranged within the second sub-border 112. The first display region 121 and the second display region 122 are two display screens arranged separately, and the display screens may be various types of display screens, for example, electronic paper display screens, liquid crystal display screens, OLED display screens or the like.

Preferably, the multipurpose conferencing terminal further includes a second control module, a first gravity sensor synchronously moving with the first display region 121 and a second gravity sensor synchronously moving with the second display region 122. For example, the first gravity sensor may be arranged on the upper edge of the first display region 121, and the second gravity sensor may be arranged on the upper edge of the second display region 122. As shown in FIG. 5, the upper edge of the first display region 121 and the upper edge of the second display region 122 refer to edges on the tops of the first display region 121 and the second display region 122 when the multipurpose conferencing terminal is bent and normally placed on the placement surface, i.e. respective edges, connected by the bending structure, of the first display region 121 and the second display region 122. None of the second control module, the first gravity sensor and the second gravity sensor is shown in the figure.

A gravity sensor can sense an included angle between its arrangement direction and gravity. The first gravity sensor and the second gravity sensor are secured to and may synchronously move with the first display region and the second display region respectively, thus the first gravity sensor is configured to detect the direction of the plane of the first display region 121; and the second gravity sensor is configured to detect the direction of the plane of the second display region 122.

The control circuit is configured to judge whether the included angle between the direction of the plane of the first display region 121 and the direction of the plane of the second display region 122 is greater than or equal to a set threshold. If the included angle is judged to be greater than or equal to the set threshold, the control circuit controls the first display region 121 and the second display region 122 to display pictures of the content information in opposite display directions; and if the included angle is judged to be less than the set threshold, the control circuit controls the first display region 121 and the second display region 122 to display the pictures of the content information in the same display direction. Specifically, the direction of the plane of the first display region 121 may be represented by the normal direction of the plane of the first display region 121, and the direction of the plane of the second display region 122 may be represented by the normal direction of the plane of the second display region 122. The set threshold may be set as any value from 0° to 180°. Preferably, the set threshold may be set as any value from 90° to 160°. When the second control module judges that the included angle is greater than or equal to the set threshold, the multipurpose conferencing terminal is in the bent state. In this case, the multipurpose conferencing terminal may be used by an attendee as an electronic table stand. Therefore, the control circuit sets the content information displayed in the first display region 121 and the second display region 122 to have opposite picture display directions and to be different, so that the attendee using the multipurpose conferencing terminal and other attendees can see the content information in the first display region 121 and the second display region 122 respectively. Herein, "opposite picture display directions" means that tops (upper edges) of the pictures of the content information respectively displayed in the first display region 121 and the second display region 122 are closer to the bending structure. Consequently, when the bent multipurpose conferencing terminal is normally placed on the placement surface, the pictures respectively displayed in the first display region 121 and the second display region 122 are both upright. When the second control module judges that the included angle is less than the set threshold, the multipurpose conferencing terminal is almost or is being in the unfolded state. In this case, the multipurpose conferencing terminal may be used by an attendee as a tablet. In this case, the second control module sets the content information displayed in the first display region 121 and the second display region 122 to have the same picture display direction and display different portions of the same picture respectively. Herein, "the same picture display direction" means that the picture displayed in the first display region 121 and the picture displayed in the second display region 122 can constitute an entire picture under the control of the second control module, so that the attendees can see continuous content information displayed in the multipurpose conferencing terminal.

Figure 6:
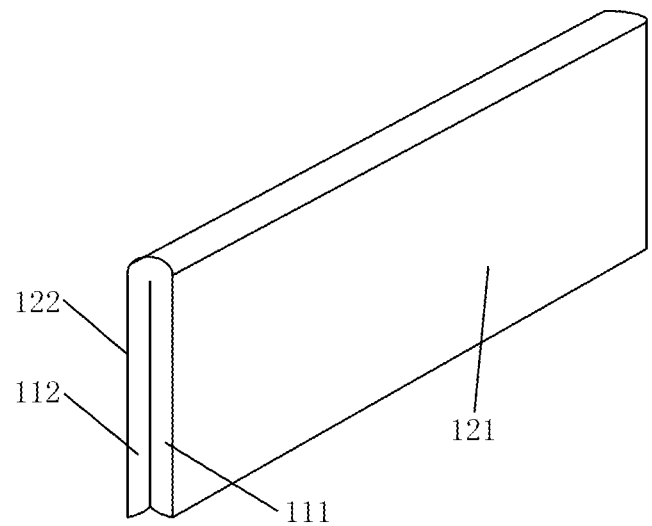
FIG. 6 is a schematic diagram of the multipurpose conferencing terminal of FIG. 3 in a folded state.

FIG. 6 is a schematic diagram of the multipurpose conferencing terminal of FIG. 3 in a folded state, as shown in FIG. 6, when it is required to fold the multipurpose conferencing terminal, in a case where the direction of the plane of the first display region 121 is represented by the normal direction of the plane of the first display region 121 and the direction of the plane of the second display region 122 is represented by the normal direction of the plane of the second display region 122, for example, the set angle between the direction of the plane of the first display region 121 and the direction of the plane of the second display region 122 may be adjusted to be 180° through the bending structure, that is, rear faces of the first display region 121 and the second display region 122 fit completely. The multipurpose conferencing terminal is allowed to be folded by providing with the bending structure, and the space for storing the multipurpose conferencing terminal may be saved by the aforementioned folding method.

The multipurpose conferencing terminal of the present invention may be switched between the bent state and the unfolded state through the bending structure. When the multipurpose conferencing terminal is in the bent state, the first display region and the second display region may display content information separately, and when the multipurpose conferencing terminal is in the unfolded state, the first display region and the second display region may be merged into one display region. Therefore, the operating experience of a user with respect to the multipurpose conferencing terminal is improved, it is convenient to fold the multipurpose conferencing terminal, and the space for storing the multipurpose conferencing terminal is saved.

Figure 7:
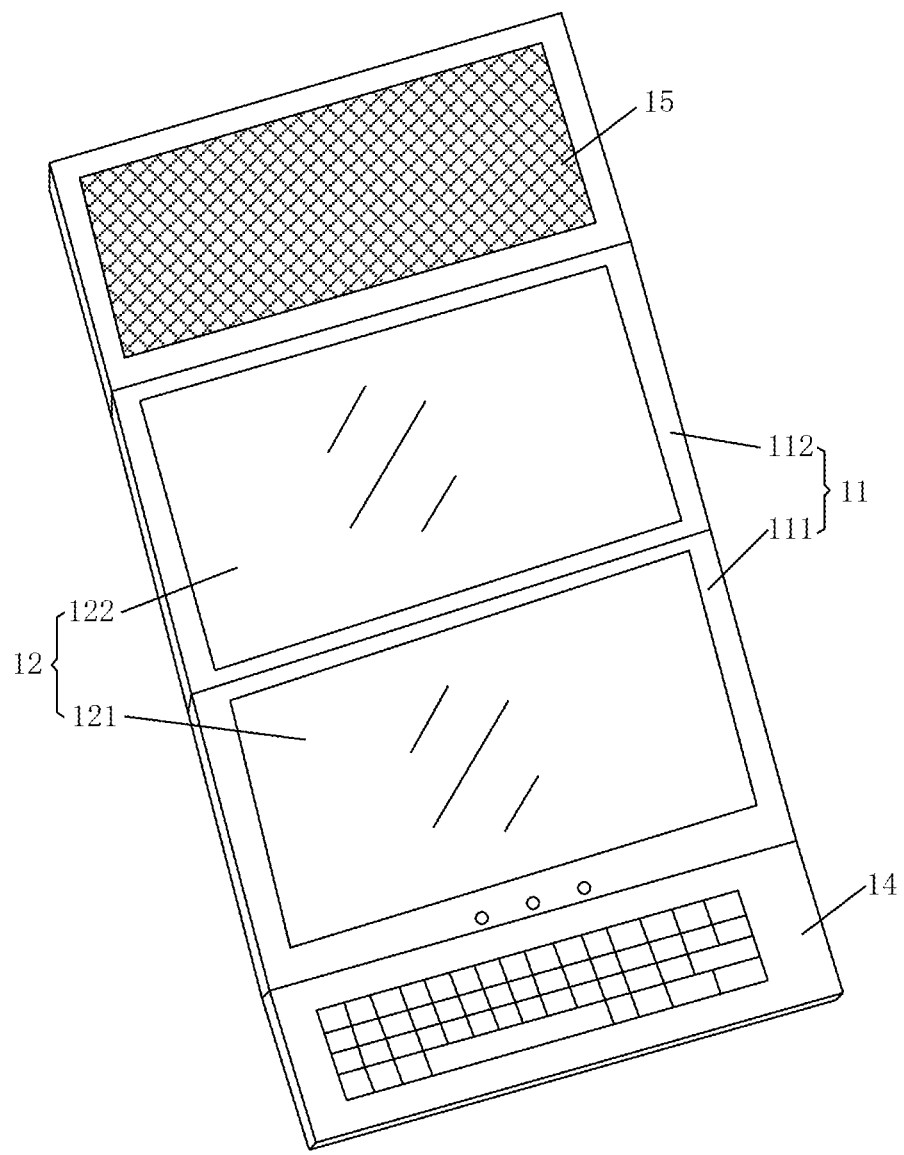
FIG. 7 is a schematic diagram of a multipurpose conferencing terminal provided by another embodiment of the present invention.
Figure 8:
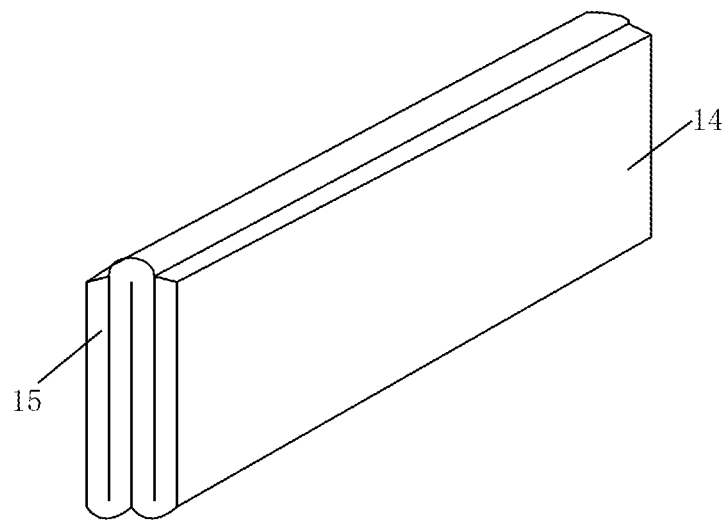
FIG. 8 is a schematic diagram of the multipurpose conferencing terminal of FIG. 7 in a folded state.
Figure 9:
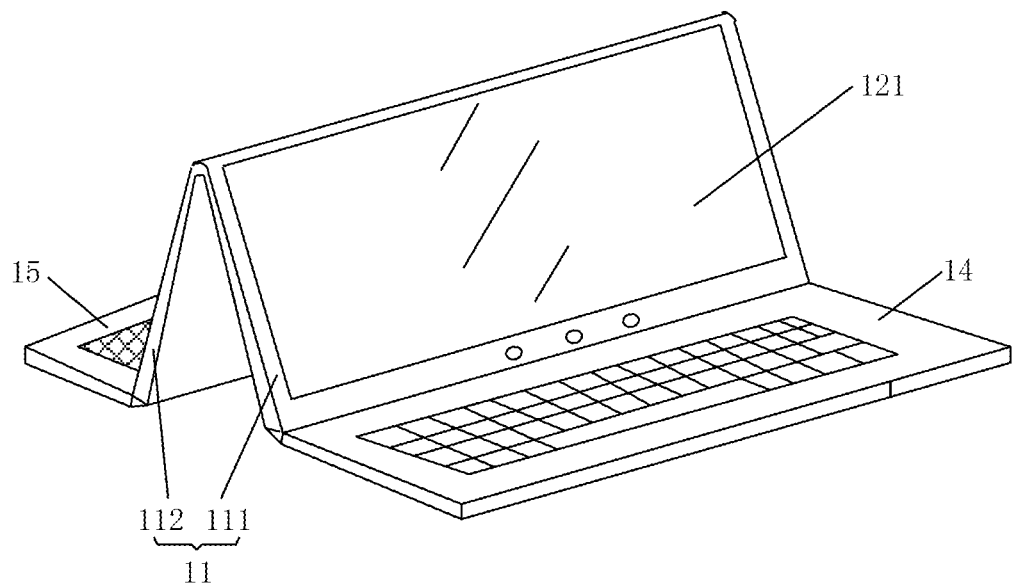
FIG. 9 is a schematic diagram of the multipurpose conferencing terminal of FIG. 7 in a use state.

FIG. 7 is a schematic diagram of a multipurpose conferencing terminal according to another embodiment of the present invention, and FIG. 8 is a schematic diagram of the multipurpose conferencing terminal of FIG. 7 in a folded state. As shown in FIG. 7 and FIG. 8, on the basis of the embodiment shown in FIG. 3, the multipurpose conferencing terminal in the embodiment shown in FIG. 7 may further include a foldable keyboard 14 which is flexibly connected to the first display region 121. In the embodiment shown in FIG. 7, the foldable keyboard 14 is flexibly connected to the border on one side of the first display region 121 to realize a flexible connection to the first display region 121. Specifically, the foldable keyboard 14 is flexibly connected to the first sub-border 111. As shown in FIG. 8, the foldable keyboard 14 is configured to protect the first display region 121 in the folded state. During folding the multipurpose conferencing terminal, the front face of the first display region 121 faces outside, the foldable keyboard 14 will cover the front face of the first display region 121 after being folded, thus to realize protection of the first display region 121. FIG. 9 is a schematic diagram of the multipurpose conferencing terminal of FIG. 7 in a use state. As shown in FIG. 9, when it is required to use the multipurpose conferencing terminal by operating the foldable keyboard 14, the foldable keyboard 14 may be unfolded and placed flat on the placement surface, thus to be used by an attendee.

As shown in FIG. 7 to FIG. 9, optionally, the multipurpose conferencing terminal may further include a protective plate 15 which is flexibly connected to the display device 12, and the protective plate 15 is configured to protect the first display region 121 or the second display region 122 in the folded state. In a solution corresponding to FIG. 7, there is only one protective plate 15 which is flexibly connected to the border on one side of the second display region 122, and specifically, the protective plate 15 is flexibly connected to the second sub-border 122. During folding the multipurpose conferencing terminal, the front face of the second display region 122 faces outside, the protective plate 15 will cover the front face of the second display region 122 after being folded, thus to realize protection of the second display region 122. When it is required to use the multipurpose conferencing terminal, the protective plate 15 is unfolded, and in this case, the protective plate 15 is placed flat on the placement surface.

In practical application, optionally, there may also be two protective plates 15. One protective plate 15 protects the first display region 121 in the folded state, and the other protective plate 15 protects the second display region 122 in the folded state. More preferably, foldable keyboards 14 may be arranged on the protective plates 15 respectively.

Optionally, a charging module may be further arranged on the protective plate 15, and configured to replenish energy to the multipurpose conferencing terminal in real time.

In practical application, as an alternative of the foldable keyboard 14, the multipurpose conferencing terminal may include a projector, a first control module and a sensing device. The projector may be arranged on the multipurpose conferencing terminal, for example, on the display device 12. The projector is configured to project a virtual keyboard onto the placement surface; the sensing device is configured to recognize the operation actions of an attendee on the projected virtual keyboard; and the first control module is configured to map the operation actions of the attendee into specific input characters or instructions one by one, thus to acquire information input by the attendee. The technology of projecting an image of the keyboard onto the surface of an object such as the placement surface to implement the function of a real keyboard is known. The virtual keyboard may also be called a projection keyboard. It may be, for example, an image of a standard keyboard projected onto the surface of an object by a red laser emitter. And then, the actions of fingers are traced through the infrared technology to acquire the input information. The projector, the first control module and the sensing device are not shown in the figure.

When the multipurpose conferencing terminal is in the bent state, the first display region and the second display region may display the content information separately. When the multipurpose conferencing terminal is in the unfolded state, the first display region and the second display region are merged into one display region. Therefore, the operating experience of a user with respect to the multipurpose conferencing terminal is improved, it is convenient to fold the multipurpose conferencing terminal, and the space for storing the multipurpose conferencing terminal is saved. When the multipurpose conferencing terminal is in the unfolded state, an attendee may operate the multipurpose conferencing terminal as a handheld flat electronic device such as a tablet, and may randomly change an angle of holding the electronic device.

Figure 10:
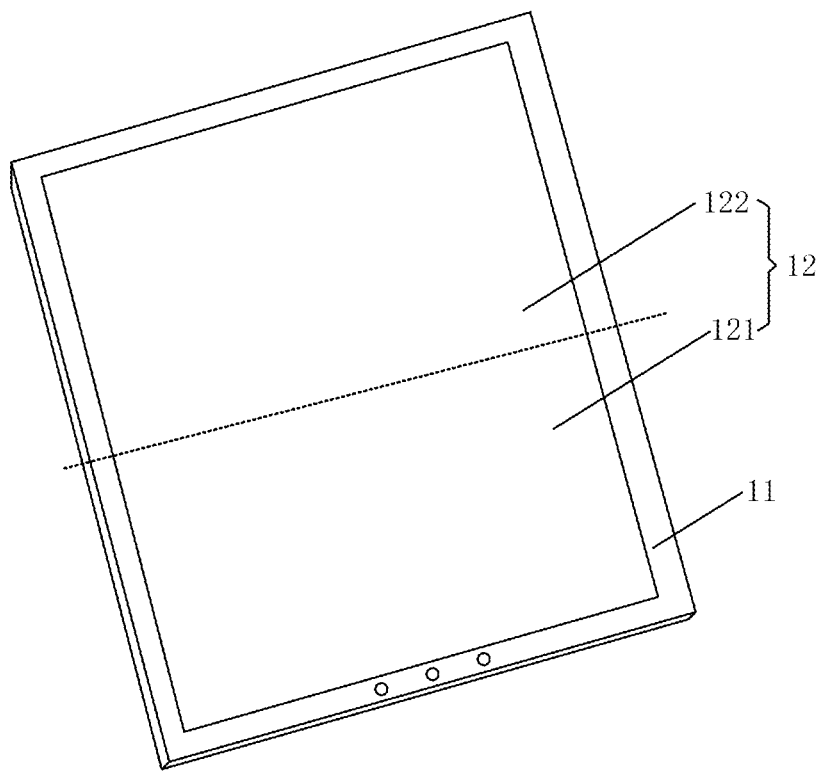
FIG. 10 is a schematic diagram of a multipurpose conferencing terminal provided by still another embodiment of the present invention.

FIG. 10 is a schematic diagram of a multipurpose conferencing terminal according to still another embodiment of the present invention. As shown in FIG. 10, the multipurpose conferencing terminal includes a display device 12 and a bending structure arranged on the display device 12. The display device 12 includes a first display region 121 and a second display region 122. The bending structure is arranged between the first display region 121 and the second display region 122, so that the first display region 121 may be bent or unfolded relative to the second display region 122.

In the embodiment shown in FIG. 10, the display device 12 is a flexible display screen, and the first display region 121 and the second display region 122 are formed integrally.

Figure 11:
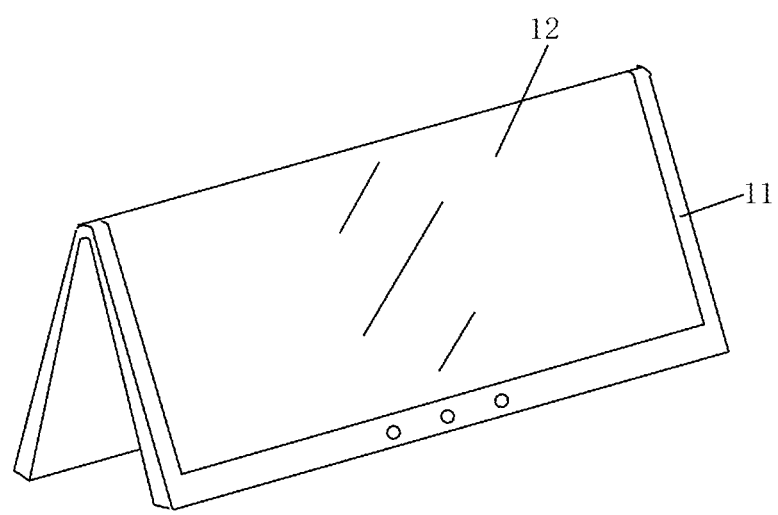
FIG. 11 is a schematic diagram of the multipurpose conferencing terminal of FIG. 10 in a bent state.

FIG. 11 is a schematic diagram of the multipurpose conferencing terminal of FIG. 10 in the bent state. As shown in FIG. 11, when the multipurpose conferencing terminal is in the bent state, the multipurpose conferencing terminal is placed on a placement surface under the support of the outer edges of the first display region 121 and the second display region 122. In this case, the first display region 121 and the second display region 122 may display content information separately. An included angle between a plane of the first display region 121 and a plane of the second display region 122 may be a set angle. The content information may include first content information and second content information. The first display region 121 may be configured to display the first content information which may be information about the conference, for example, the information about the conference may be conference schedule or presentation content; and the second display region 122 may be configured to display the second content information, for example, the second content information may be information such as name and position of an attendee. In this case, the multipurpose conferencing terminal may be used by an attendee as an electronic table stand. The placement surface may be a table top. The display device 12 may include a borderless display device and a bordered display device. In a solution shown in FIG. 10, the display device 12 is a bordered display device. That is, the multipurpose conferencing terminal further includes a border 11 which is configured to secure the display device 12, and the display device 12 may be arranged within the border 11. Optionally, an anti-slip mat (not shown in the figure) is provided in a portion, configured to come into contact with the placement surface when the multipurpose conferencing terminal is in the bent state, of the border 11, so as to maintain the bending posture of the multipurpose conferencing terminal stable when the multipurpose conferencing terminal is placed on the placement surface such as a table top and the like.

As shown in FIG. 10, when the multipurpose conferencing terminal is in an unfolded state, the first display region 121 and the second display region 122 are merged into one display region, so that the multipurpose conferencing terminal may serve as a flat portable electronic device such as a tablet. Preferably, the bending structure is configured to cause the first display region 121 and the second display region 122 to be in the same plane when the multipurpose conferencing terminal is in the unfolded state, consequently, the first display region 121 and the second display region 122 are merged into one display region to display an entire picture together, so that the multipurpose conferencing terminal may have a larger display area and display more content in one display region. In this case, an attendee may hold and operate the multipurpose conferencing terminal at any angle.

Figure 12:
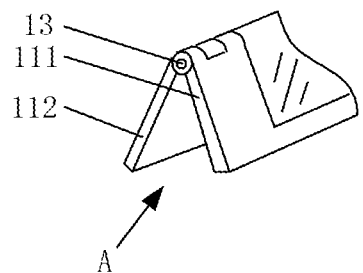
FIG. 12 is a schematic diagram of a bending structure of the multipurpose conferencing terminal of FIG. 10.
Figure 13:
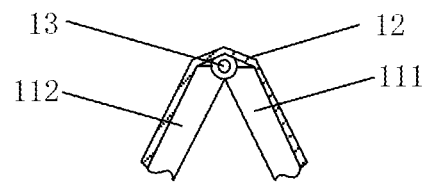
FIG. 13 is a view of the bending structure of the multipurpose conferencing terminal of FIG. 12 along a direction A.
Figure 14:
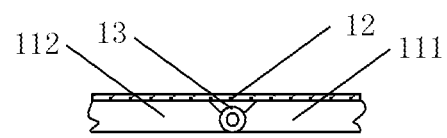
FIG. 14 is a sectional view of the multipurpose conferencing terminal of FIG. 12 in an unfolded state.

FIG. 12 is a schematic diagram of the bending structure of the multipurpose conferencing terminal of FIG. 10, FIG. 13 is a view of the bending structure of the multipurpose conferencing terminal of FIG. 12 along a direction A; and FIG. 14 is a sectional view of the multipurpose conferencing terminal of FIG. 12 in an unfolded state. As shown in FIG. 12 to FIG. 14, the bending structure 13 is positioned between the first display region 121 and the second display region 122. In a solution corresponding to FIG. 10, the bending structure 13 is arranged on the border 11. The bending structure 13 may be a structure capable of folding the multipurpose conferencing terminal. Preferably, the bending structure 13 is a hinge. With the hinge, the flexible display screen may be ensured to be bent at a preset position rather than to be bent randomly in an arch bridge shape. Consequently, it is convenient to bend the multipurpose conferencing terminal into a desired bracket form. Or, the bending structure may be, for example, two rigid sheets connected with each other by flexible material. Or, the bending structure may be constituted of a plurality of nested rigid components capable of moving relative to each other, for example, like a variable support for a table lamp. The rigid portion of the bending structure may be secured with the display device by, for example, bonding, buckling, inlaying and other means.

The bending structure 13 may be arranged at a set distance from a display surface of the display device 12 when the multipurpose conferencing terminal is in the unfolded state. That is to say, as shown in FIG. 14, when the multipurpose conferencing terminal is in the unfolded state, the display surface of the display device 12 is higher than the highest point of the bending structure 13. In this case, when the multipurpose conferencing terminal is in the bent state, there is a certain space margin between the display surface of the display device 12 and the bending structure 13, thus to prevent the screen (i.e. the display surface) of the display device from being damaged by a large tensile force, and prevent the displayed picture from being distorted.

Preferably, the multipurpose conferencing terminal further includes a second control module, a first gravity sensor synchronously moving with the first display region 121 and a second gravity sensor synchronously moving with the second display region 122. For example, the first gravity sensor may be arranged on the upper edge of the first display region 121, and the second gravity sensor may be arranged on the upper edge of the second display region 122. As shown in FIG. 5, the upper edge of the first display region 121 and the upper edge of the second display region 122 refer to edges on the tops of the first display region 121 and the second display region 122 when the multipurpose conferencing terminal is bent and normally placed on the placement surface, i.e., respective edges, connected with each other by the bending structure, of the first display region 121 and the second display region 122. None of the second control module, the first gravity sensor and the second gravity sensor is shown in the figure.

A gravity sensor can sense an included angle between its arrangement direction and gravity. The first gravity sensor and the second gravity sensor are secured to and may synchronously move with the first display region and the second display region respectively, thus the first gravity sensor is configured to detect the direction of the plane of the first display region 121; and the second gravity sensor is configured to detect the direction of the plane of the second display region 122.

The control circuit is configured to judge whether the included angle between the direction of the plane of the first display region 121 and the direction of the plane of the second display region 122 is greater than or equal to a set threshold. If the included angle is judged to be greater than or equal to the set threshold, the control circuit controls the first display region 121 and the second display region 122 to display pictures of the content information in opposite display directions. If the included angle is judged to be less than the set threshold, the control circuit controls the first display region 121 and the second display region 122 to display the pictures of the content information in the same display direction. Specifically, the direction of the plane of the first display region 121 may be represented by the normal direction of the plane of the first display region 121, and the direction of the plane of the second display region 122 may be represented by the normal direction of the plane of the second display region 122. The set threshold may be set as any value from 0° to 180°. Preferably, the set threshold may be set as any value from 90° to 160°. When the second control module judges that the included angle is greater than or equal to the set threshold, the multipurpose conferencing terminal is in the bent state. In this case, the multipurpose conferencing terminal may be used by an attendee as an electronic table stand. Therefore, the control circuit sets the content information displayed in the first display region 121 and the second display region 122 to have opposite picture display directions and to be different, so that the attendee using the multipurpose conferencing terminal and other attendees can see the content information in the first display region 121 and the second display region 122 respectively. When the second control module judges that the included angle is less than the set threshold, the multipurpose conferencing terminal is almost or is being in the unfolded state. In this case, the multipurpose conferencing terminal may be used by an attendee as a tablet. In this case, the first display region 121 and the second display region 122 may be regarded as one display region. The second control module sets the contend information displayed in the first display region 121 and the second display region 122 to have the same picture display direction and display different portions of the same picture, so that the attendees may see continuous content information displayed in the multipurpose conferencing terminal.

Optionally, in the embodiment shown in FIG. 10, the multipurpose conferencing terminal may further include a foldable keyboard, and the specific description of the foldable keyboard may refer to the aforementioned description of the embodiment shown in FIG. 7.

Optionally, in the embodiment shown in FIG. 10, the multipurpose conferencing terminal may further include a protective plate, and the specific description of the protective plate may refer to the aforementioned description of the embodiment shown in FIG. 7.

Optionally, in the embodiment shown in FIG. 10, the multipurpose conferencing terminal may further include a projector configured to project a virtual keyboard onto the placement surface, etc., and the specific description of the virtual keyboard may refer to the aforementioned description of the embodiment shown in FIG. 7.

The description of the folded state of the multipurpose conferencing terminal in the embodiment shown in FIG. 10 may refer to the description of the embodiment shown in FIG. 3 or the embodiment shown in FIG. 7, and will not be repeated herein.

The multipurpose conferencing terminal of the present invention may be switched between the bent state and the unfolded state through the bending structure. When the multipurpose conferencing terminal is in the bent state, the first display region and the second display region may display the content information separately. When the multipurpose conferencing terminal is in the unfolded state, the first display region and the second display region may be merged into one display region. Therefore, the operating experience of a user with respect to the multipurpose conferencing terminal is improved, it is convenient to fold the multipurpose conferencing terminal, and the space for storing the multipurpose conferencing terminal is saved. When the multipurpose conferencing terminal is in the unfolded state, the multipurpose conferencing terminal may be used as a handheld flat electronic device such as a tablet, and an attendee may randomly change an angle of holding the electronic device.

It should be understood that the aforementioned implementations are exemplary implementations merely for describing the principle of the present invention, and the present invention is not limited thereto. For a person of ordinary skill in the art, various variations and improvements may be made without departing from the spirit and essence of the present invention, and those variations and improvements should also be regarded as falling into the protection scope of the present invention.

The invention claimed is:
1. A multipurpose conferencing terminal, comprising a display device and a control circuit, and the control circuit comprises a wireless communication module through which the multipurpose conferencing terminal communicates with a mobile terminal of a corresponding attendee of a conference, wherein
the multipurpose conferencing terminal further comprises a person detection module;
the control circuit further comprises a first judgment module and a recording module;

the person detection module is configured to acquire one or more images, and send the acquired one or more images to the first judgment module;

the first judgment module is configured to judge whether the corresponding attendee has left the conference according to the acquired one or more images; and the recording module is configured to record content of the conference when the first judgment module judges that the corresponding attendee has left the conference.

2. The multipurpose conferencing terminal according to claim 1, wherein the control circuit is configured to create a communicative connection with the mobile terminal of the corresponding attendee through the wireless communication module, and acquire stored terminal information from the mobile terminal; and the display device is configured to display the acquired terminal information.

3. The multipurpose conferencing terminal according to claim 1, wherein the multipurpose conferencing terminal further comprises a body parameter measuring device, and the control circuit further comprises a second judgment module and a prompting module;

the body parameter measuring device is configured to measure body information of the corresponding attendee;

the second judgment module is configured to judge body state of the corresponding attendee according to the body information; and the prompting module is configured to send prompt information according to the body state of the corresponding attendee.

4. The multipurpose conferencing terminal according to claim 1, wherein the control circuit further comprises an interference module; and the interference module is configured to cause interference with the mobile terminal under a preset condition.

5. The multipurpose conferencing terminal according to claim 4, wherein the control circuit further comprises a privilege authentication module; and the privilege authentication module is configured to perform privilege authentication on the mobile terminal, and allow the mobile terminal to communicate with other communication devices outside a conference room after the privilege authentication is successful.

6. The multipurpose conferencing terminal according to claim 1, wherein the control circuit further comprises a positioning module and an alarm module;

the positioning module is configured to detect a position of the multipurpose conferencing terminal; and the alarm module is configured to send alarm information when the positioning module detects that the multipurpose conferencing terminal has been taken away from a conference room in a set period of time.

7. A multipurpose conferencing system, comprising a plurality of multipurpose conferencing terminals and at least one mobile terminal of an attendee corresponding to one of the multipurpose conferencing terminals; and the multipurpose conferencing terminals are the multipurpose conferencing terminal according to claim 1.

8. The multipurpose conferencing system according to claim 7, wherein an instant communication is performed among the multipurpose conferencing terminals.

9. The multipurpose conferencing system according to claim 8, further comprising a main server of the conference; and the main server of the conference is configured to send instruction information or server information to the multipurpose conferencing terminals, and/or receive data information from the multipurpose conferencing terminals and process the data information.

10. The multipurpose conferencing system according to claim 9, wherein the control circuit further comprises a guide signal module; and the guide signal module is configured to send guide information according to the instruction information sent by the main server, and the guide information is used for guiding the corresponding attendee to his/her seat.

11. The multipurpose conferencing system according to claim 10, wherein the instruction information is sent after the main server receives a guide request sent by the mobile terminal of the corresponding attendee, the instruction information is used for instructing the multipurpose conferencing terminal corresponding to the mobile terminal to provide guidance, and the guide request is sent when the mobile terminal of the corresponding attendee communicates with the main server.

12. The multipurpose conferencing system according to claim 7, wherein the control circuit is configured to create a communicative connection with the mobile terminal of the corresponding attendee through the wireless communication module, and acquire stored terminal information from the mobile terminal; and the display device is configured to display the acquired terminal information.

13. The multipurpose conferencing system according to claim 7, wherein the multipurpose conferencing terminal communicates with a main server of the conference; and the control circuit is further configured to receive server information sent by the main server of the conference, and send the server information to the mobile terminal through the wireless communication module.

14. The multipurpose conferencing system according to claim 7, wherein the multipurpose conferencing terminal further comprises a body parameter measuring device, and the control circuit further comprises a second judgment module and a prompting module;

the body parameter measuring device is configured to measure body information of the corresponding attendee;

the second judgment module is configured to judge body state of the corresponding attendee according to the body information; and the prompting module is configured to send prompt information according to the body state of the corresponding attendee.

15. The multipurpose conferencing system according to claim 7, wherein the control circuit further comprises an interference module; and the interference module is configured to cause interference with the mobile terminal under a preset condition.

16. The multipurpose conferencing terminal according to claim 15, wherein the control circuit further comprises a privilege authentication module; and the privilege authentication module is configured to perform privilege authentication on the mobile terminal, and allow the mobile terminal to communicate with other communication devices outside a conference room after the privilege authentication is successful.

17. The multipurpose conferencing system according to claim 7, wherein the control circuit further comprises a positioning module and an alarm module;

the positioning module is configured to detect a position of the multipurpose conferencing terminal; and the alarm module is configured to send alarm information when the positioning module detects that the multipurpose conferencing terminal has been taken away from a conference room in a set period of time.

18. The multipurpose conferencing terminal according to claim 1, wherein the multipurpose conferencing terminal communicates with a main server of the conference; and the control circuit is further configured to receive server information sent by the main server of the conference, and send the server information to the mobile terminal directly through the wireless communication module while not through the main server.

\* \* \* \* \*